(12) United States Patent
Florit et al.

(10) Patent No.: US 11,381,391 B2
(45) Date of Patent: Jul. 5, 2022

(54) PRE-SHARED SECRET KEY CAPABILITIES IN SECURE MAC LAYER COMMUNICATION PROTOCOLS

(71) Applicant: Cisco Technology, Inc., San Jose, CA (US)

(72) Inventors: Lionel Florit, Greenbrae, CA (US); Chennakesava Reddy Gaddam, Bangalore (IN); Annu Singh, Bangalore (IN); Gaurav Kumar, Ludhiana (IN); Shwetha Subray Bhandari, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/902,081

(22) Filed: Jun. 15, 2020

(65) Prior Publication Data
US 2021/0391984 A1      Dec. 16, 2021

(51) Int. Cl.
*H04L 29/06*   (2006.01)
*H04L 9/08*    (2006.01)
*H04L 9/40*    (2022.01)

(52) U.S. Cl.
CPC ............ *H04L 9/085* (2013.01); *H04L 9/0838* (2013.01); *H04L 63/162* (2013.01)

(58) Field of Classification Search
None
See application file for complete search history.

(56) References Cited

U.S. PATENT DOCUMENTS

| | | | | |
|---|---|---|---|---|
| 6,681,017 B1* | 1/2004 | Matias | ................. | H04L 63/045 380/277 |
| 7,734,052 B2* | 6/2010 | Braskich | ............... | H04L 9/3271 380/284 |
| 8,086,872 B2* | 12/2011 | Kim | ................... | H04Q 11/0067 713/153 |

(Continued)

FOREIGN PATENT DOCUMENTS

WO       WO2018177905 A1      10/2018

OTHER PUBLICATIONS

IEEE Std 802.1X-2010 (Year: 2010).*
"Quantum-Safe Virtual Private Networks", ETSI TR 103 617 V1.1.1, Sep. 2018, pp. 1-35.

*Primary Examiner* — Maung T Lwin
(74) *Attorney, Agent, or Firm* — Lee & Hayes, P.C.

(57) ABSTRACT

A first computing node configures for communication with a second computing node according to a secure Media Access Layer (MAC) layer communication protocol. The first computing node transmits a first message, to the second computing node. The first message includes at least a first indication that the first computing node is capable of communicating according to the secure MAC layer communication protocol based on a pre-shared secret key. The first computing nodes determines to communicate with the second computing node according to the secure MAC layer communication protocol based on one of a pre-shared secret key or a distributed shared key. The first computing node, at least in part based on the determining, transmits a second message to the second computing node according to the secure MAC layer communication protocol based on the one of the pre-shared secret key or the distributed shared key.

20 Claims, 10 Drawing Sheets

| Bit | 8 | 7 | 6 | 5 | 4 | 3 | 2 | 1 | Octet |
|---|---|---|---|---|---|---|---|---|---|
| | Paramter set Type = xxx | | | | | | | | 1 |
| | Distributed AN | | Confidentiality Offset | | X | X | X | X | 2 |
| | X | X | X | X | Parameter Set Body Length | | | | 3 |
| | Parameter Set Body Length (continued) | | | | | | | | 4 |
| | Key Number | | | | | | | | 5-8 |
| | MACSec Cipher Suite | | | | | | | | 9-16 |
| | PSK_ID Type | | | | | | | | 17 |
| | AES Key Wrap of PSK_ID | | | | | | | | 18-41 |

500

(56) References Cited

U.S. PATENT DOCUMENTS

| | | | |
|---|---|---|---|
| 2007/0226502 A1* | 9/2007 | Tenny | H04L 9/0891 |
| | | | 713/170 |
| 2008/0123852 A1* | 5/2008 | Jiang | H04L 9/0891 |
| | | | 380/273 |
| 2009/0103731 A1* | 4/2009 | Sarikaya | H04L 9/3236 |
| | | | 726/14 |
| 2010/0211790 A1* | 8/2010 | Zhang | H04L 9/321 |
| | | | 713/168 |
| 2011/0252239 A1* | 10/2011 | Lai | H04L 9/3273 |
| | | | 713/168 |
| 2013/0290834 A1* | 10/2013 | Ginetti | G06F 30/39 |
| | | | 715/243 |
| 2014/0226820 A1* | 8/2014 | Chopra | H04L 63/0485 |
| | | | 380/277 |
| 2019/0281031 A1 | 9/2019 | Pothula et al. | |
| 2019/0349207 A1* | 11/2019 | Merchan | H04L 9/3242 |
| 2019/0386824 A1 | 12/2019 | Havaralu Rama Chandra Adiga et al. | |
| 2020/0067891 A1* | 2/2020 | Singh | H04L 63/0876 |

\* cited by examiner

| Bit: | 8 | 7 | 6 | 5 | 4 | 3 | 2 | 1 | Octet |
|---|---|---|---|---|---|---|---|---|---|
| | Parameter set Type = 4 | | | | | | | | 1 |
| | Distributed AN | | Confidentiality Offset | | SAK(0)/ PSK_ID(1) | X | X | X | 2 |
| | X | X | X | X | X | | | | |
| | Parameter Set Body Length | | | | | | | | 3 |
| | Parameter Set Body Length (continued) | | | | | | | | 4 |
| | Key Number | | | | | | | | 5-8 |
| | MACsec Cipher Suite | | | | | | | | 9-16 |
| | AES Key Wrap of SAK/PSK_ID | | | | | | | | 17-40 |

PRE-SHARED SECRET KEY CAPABILITIES IN SECURE MAC LAYER COMMUNICATION PROTOCOLS

TECHNICAL FIELD

The present disclosure relates generally to key agreement protocols and, more specifically, to a streamlined method for use of pre-shared secret keys.

BACKGROUND

MACsec (Media Access Control security) is a secure MAC layer communication protocol. MACsec is a Layer 2 hop-by-hop encryption methodology that provides data confidentiality, integrity, and replay protection for media access-independent protocols. MACsec is described in the Institute of Electrical and Electronics Engineers (IEEE) 802.1AE standard, originally published in 2006 and revised in 2018. MACsec provides MAC layer encryption over networks by using out-of-band methods for encryption keying. MACsec encrypts all the data, except the source and destination MAC addresses of an Ethernet packet. Data can be secured on physical media using MACsec, which prevents data compromise at higher layers. As a result, MACsec encryption may take priority over any other encryption method, at higher layers. MACsec provides integrity for the entire frame including the source and destination MAC addresses.

Setting up a MACsec service utilizes a security association (SA) protocol, the MACsec Key Agreement (MKA) protocol. The MKA protocol is based on the IEEE 802.1x-2010 standard. The MKA protocol describes how session keys are provided and how encryption keys are managed. The MKA uses an Extensible Authentication Protocol Transport Layer Security (EAP-TLS) authentication method to mutually authenticate and get a Master Session Key (MSK) from which a Connectivity Association Key (CAK) is dynamically derived. The CAK is the root key for MKA key derivations.

A quantum attack on TLS, which is a public-key cryptography, may eventually compromise the MKA CAK and/or perhaps other keys, which would put the security of MACsec traffic at risk. However, it is thought that the MKA protocol may be made quantum secure.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates an example format of a basic parameter set of an Extensible Authentication Protocol over LAN (EAPOL)-announcement message, as modified to include an indication that a station is capable of secure MAC layer communication based on a pre-shared secret key.

DESCRIPTION OF EXAMPLE EMBODIMENTS

Overview

Figure 1:
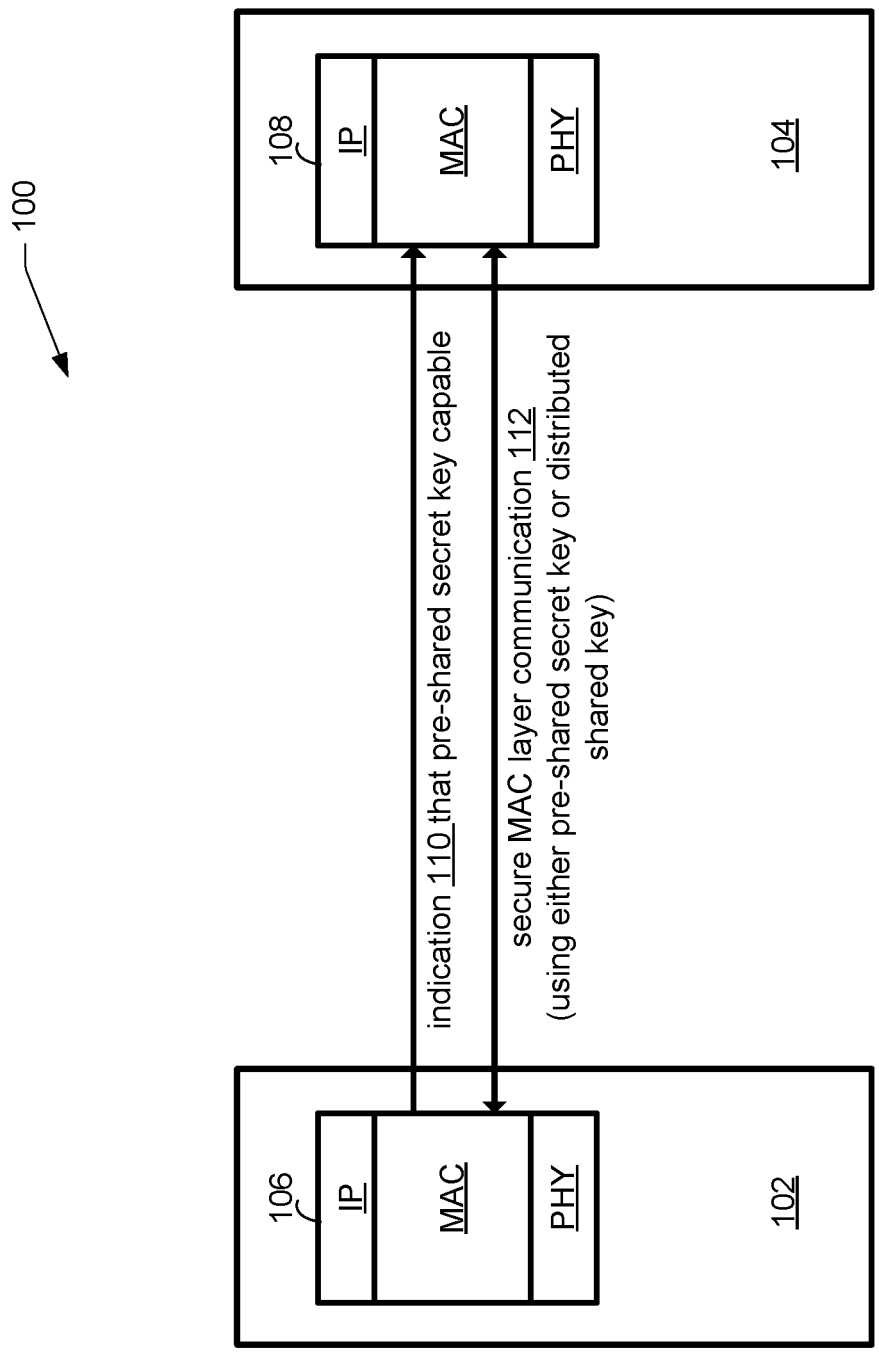
FIG. 1 is a diagram illustrating a system including a first station and a second station that are configured to communicate according to a secure MAC layer communication protocol based on either a pre-shared secret key or a distributed shared key.

This disclosure describes a method for a first computing node to configure for communication with a second computing node according to a secure Media Access Layer (MAC) layer communication protocol. The first computing node transmits a first message, to the second computing node. The first message includes at least a first indication that the first computing node is capable of communicating according to the secure MAC layer communication protocol based on a pre-shared secret key. The first computing node determines to communicate with the second computing node according to the secure MAC layer communication protocol based on one of a pre-shared secret key or a distributed shared key. The first computing node, at least in part based on the determining, transmits a second message to the second computing node according to the secure MAC layer communication protocol based on one of a pre-shared secret key or a distributed shared key.

The disclosure further describes a method for a second computing node to configure for communication with a first computing node according to a secure Media Access Layer (MAC) layer communication protocol. The second computing node receives a first message from the first computing node. The first message includes at least a first indication that the first computing node is capable of communicating according to the secure MAC layer communication protocol based on a pre-shared secret key. The second computing node transmits a second message to the first computing node. The second message includes a second indication that the second computing node is capable of communicating according to the secure MAC layer communication protocol based on a pre-shared secret key. The second computing node receives a third message from the first computing node according to the secure MAC layer communication protocol based on the pre-shared secret key.

The disclosure further describes a method for a second computing node to configure for communication with a first computing node according to a secure Media Access Layer (MAC) layer communication protocol. The second computing node receives a first message from the first computing node, the first message includes at least a first indication that the first computing node is capable of communicating according to the secure MAC layer communication protocol based on a pre-shared secret key. The second computing node receives a second message from the first computing node. The second message includes a pre-shared key identifier distributed by the first computing node. The second computing node receives a third message from the first computing node according to the secure MAC layer communication protocol based on the distributed shared key.

Additionally, the techniques described herein may be performed by a system and/or device having non-transitory computer-readable media storing computer-executable instructions that, when executed by one or more processors, performs the methods described herein.

Example Embodiments

A "distributed shared key" is a key that has been produced, such as by a software or hardware module, and a copy transported in an unspecified way from a location 1 to a location N. Therefore, stations in location 1 and N may use the same key, which is referred to as "distributed shared key". A "pre-shared secret key" is a key that has been produced, such as by a software or hardware module, or is configured in a location 1 and N as a key value pair (key identifier and key). Using pre-shared secret keys can ameliorate the risk of quantum attack on encrypted communication. For example, each entity may separately build a session key, for encrypting communication between the two entities, by processing the pre-shared secret key using the same key derivation function.

In some examples, as a communication link is being established, a pre-shared key identifier is communicated from one entity to the other entity. The pre-shared key-identifier may be utilized, for example, by each entity as a seed for each entity to separately generate the same pre-shared secret key or separately securely obtain the pre-shared secret key from a key source. The pre-shared secret key may be separately generated or obtained by each entity and may then be used by each entity as the basis for building the session key to be used for secure communication between the two entities.

In establishing communications and/or communicating according to the MACsec protocol, a pre-shared key may be utilized if both to-be communicating entities are capable of establishing a communication link and/or communicating based on a pre-shared key. IEEE 802.1x-2010 standard describes how pre-shared keys may be utilized including for example, at Section 6.2.

The pre-shared key may include a connectivity association key name (CKN) and a connectivity association key (CAK). A pre-shared key may be exchanged between two devices at each end of a point-to-point link to enable MACsec using static CAK security mode. The MACsec Key Agreement (MKA) protocol is enabled after the pre-shared keys are successfully verified and exchanged. The pre-shared keys, the CKN and CAK, must match on both ends of a link in order for communication to be established.

In some examples according to the MACsec protocol, the MKA protocol is extended to allow a key server (KS) entity to distribute a post-quantum pre-shared key identifier (PSK_ID) to a non-key server (NKS) peer entity. This distribution of PSK_ID is in place of distributing an actual MACsec secret key (SAK) to MACsec peers. The PSK_ID may be negotiated between the KS and NKS entities. Both the KS and NKS entities may use the negotiated PSK_ID to separately obtain the same pre-shared secret key (PSK) from a quantum key source (QKS), which will serve as MACsec secret key (SAK) for securing communication between the KS and NKS entity or the basis for determining the SAK.

In some examples, one entity may be configured to establish a MAC layer communication link and/or communicate based on a post-quantum (or other) pre-shared secret key whereas another entity may not be capable of and/or configured to establish a MAC layer communication link and/or communicate based on a pre-shared secret key. For example, for entities that may communicate using MACsec, a KS entity may be configured to establish a MAC layer communication link and/or communicate based on a pre-shared secret key whereas an NKS entity may not be capable of and/or configured to establish a MAC layer communication link and/or communicate based on a pre-shared secret key.

It may be desirable to be backwards-compatible, so that an entity such as a station or a computing node that is capable of establishing a MAC layer communication link and/or securely communicating based on a pre-shared secret key may establish a MAC layer communication link and/or communicate with another entity instead based on a distributed shared key if, for example, the other entity is not capable of securely communicating based on a pre-shared secret key.

In some examples, an entity advertises its capability to communicate using a secure MAC layer communication protocol based on a pre-shared secret key. However, protocols for secure MAC layer communication may not inherently include functionality for an entity to advertise its ability to communicate using a secure MAC layer communication protocol based on a pre-shared secret key. An entity that receives such an advertisement may not actually have capability to communicate using a secure MAC layer communication protocol based on a pre-shared secret key. Moreover, an entity that receives such an advertisement may not respond to it or even know how to respond to it.

In some examples, after an entity advertises to another entity its capability to communicate according to a secure MAC layer communication protocol based on a pre-shared secret key, the entity may make a determination whether to establish communication with the other entity according to the secure MAC layer communication protocol based on a pre-shared secret key or to establish communication with the other entity according to the secure MAC layer communication protocol based on a distributed shared key.

For example, the entity may make the determination based at least in part on not receiving a response to the advertisement by the entity of its capability to communicate using a secure MAC layer communication protocol based on a pre-shared secret key. For example, the entity may wait a predetermined time for such a response and, if the response is not received, the entity may make a determination to establish communication with the other entity according to the secure MAC layer communication protocol based on a distributed shared key. For example, as part of establishing secure MAC layer communication with the other entity, the entity may distribute a key to the other entity to be shared for conducting secure MAC layer communication between the entity and the other entity based on the distributed shared key.

In some examples, the entity may receive a response, such as within the predetermined waiting time. The received response may be an advertisement of the other entity's capability to communicate according to a secure MAC layer communication protocol based on a pre-shared secret key. Based at least in part on the entity receiving such a response, the entity may make a determination to establish communication with the other entity according to the secure MAC layer communication protocol based on a pre-shared secret key.

In some examples, the entity may provide an indication of a pre-shared secret key to the other entity, and the other entity may respond with an indication that the other entity accepts or rejects the indication of the pre-shared secret key. Based at least partly on the indication of the other entity accepting or rejecting the indication of the pre-shared secret key, the entity may make a determination to establish communication with the other entity according to the secure MAC layer communication protocol based on a pre-shared secret key or to establish communication with the other entity according to the secure MAC layer communication protocol based on a distributed shared key. For example, for communication according to the secure MAC layer communication protocol based on a pre-shared secret key, the entity and the other entity may each operate to independently determine the pre-shared secret key based on the indication of the pre-shared secret key the entity provides to the other entity.

As mentioned above, the other entity may not even know how to respond to an advertisement from the entity of the entity's capability to communicate according to a secure MAC layer communication protocol based on a pre-shared secret key. The other entity may not respond to an advertisement the other entity receives indicating the entity's capability to communicate according to a secure MAC layer communication protocol based on a pre-shared secret key. The other entity may receive a shared key distributed from the entity, and the other entity may communicate with the entity according to the secure MAC layer communication protocol based on the distributed shared secret key.

The techniques described herein may be performed by a system and/or device having non-transitory computer-readable media storing computer-executable instructions that, when executed by one or more processors, performs the methods described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a diagram illustrating a configuration 100 including a first station 102 and a second station 104. As illustrated in FIG. 1, the first station 102 includes a communication stack 106. The communication stack 106 is configured to implement one or more protocols at each layer of the communication stack 106. The layers may be thought of, for example, as layers of a communication stack according to the Open Systems Interconnection (OSI) model. The OSI model is a model that characterizes the communication functions of the first station 102 in a conceptual way. In the FIG. 1 example, the communication stack 106 includes a physical (PHY) layer, a Media Access Control (MAC) layer and an Internet Protocol (IP) layer. The second station 104 similarly includes a communication stack 108. The communication stack 108 also includes a PHY layer, a MAC layer and an IP layer.

As illustrated in FIG. 1, the first station 102 provides an indication 110 to the second station 104 that the first station 102 is capable of communicating according to the secure MAC layer communication protocol based on a pre-shared secret key. As also illustrated in FIG. 1, the first station 102 and the second station 104 are communicating 112 at the MAC layer according to a secure MAC layer communication protocol based on the pre-shared secret key or a distributed shared key. That is, at least a portion of the communication 112 at the MAC layer is encrypted by the transmitting one of the first station 102 or the second station 104, and the encrypted portion is decrypted by the receiving one of the first station 102 or the second station 104. As mentioned above, the MACsec protocol is an example of a secure MAC layer communication protocol.

Figure 2:
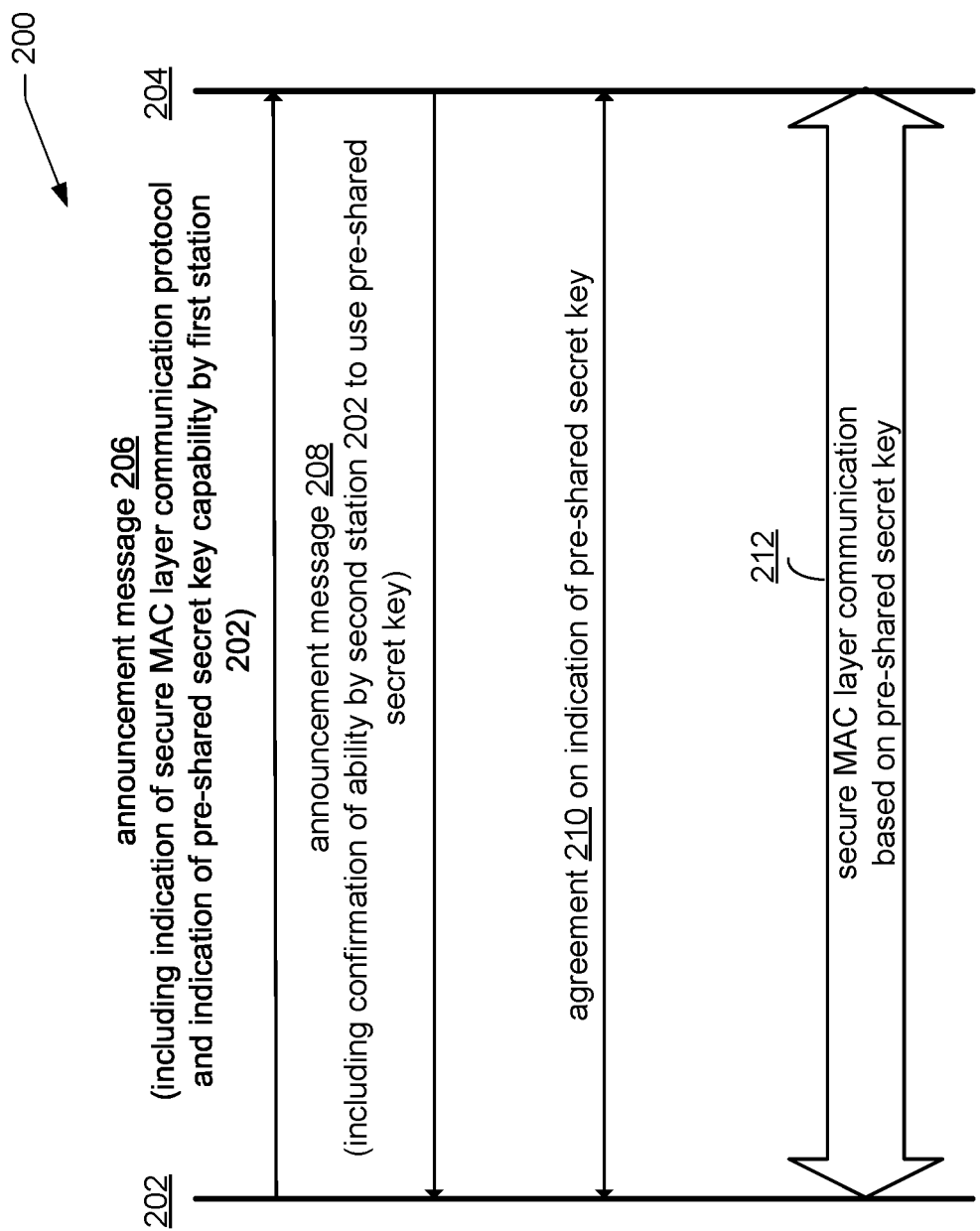
FIG. 2 is a diagram illustrating a system including a first station and a second station and shows detail of messages exchanged between the first station and the second station in the process of configuring for communication according to a secure MAC layer communication protocol.

FIG. 2 is a diagram illustrating a configuration 200 including a first station 202 and a second station 204. The first station 202 transmits, to the second station 204, an announcement message 206 concerning network access conditions. In one example, the announcement message 206 is an Extensible Authentication Protocol over LAN (EAPOL) announcement message such as is described at Section 11.12 of IEEE Std 802.1X-2010. The network access conditions indicated in the announcement message 206 may include an indication of a secure MAC layer communication protocol to use for communication between the first station 202 and the second station 204. The announcement message 206 also includes an indication that the first station 202 is capable of secure MAC layer communication with the second station 204 according to the indicated secure MAC layer communication protocol, based on a pre-shared secret key.

If the announcement message 206 is an EAPOL announcement message, the indication of the secure MAC layer communication protocol may, for example, be encoded in a basic parameter set of the EAPOL announcement message as described in Table 11-7 and Figure 11-18 of IEEE Std 802.1X-2010. Furthermore, if the announcement message 206 is an EAPOL announcement message, the indication in the announcement message 206 that the first station 202 is capable of secure MAC layer communication with the second station 204 according to the indicated secure MAC layer communication protocol based on the pre-shared secret key may be included in a PSK capabilities TLV. The PSK capabilities TLV is not explicitly described in IEEE Std 802.1X-2010. The PSK capabilities TLV may be included as a TLV type that is reserved for future standardization, as described in Table 11-8 of IEEE Std 802.1X-2010 ("EAPOL-Announcement TLVs). Furthermore, by using a TLV type that is near or at the end of the reserved TLV types, such as TLV type 110, there is minimal risk that the TLV type would be otherwise used in future standardization. As such, the PSK capabilities TLV may be implemented even without being included in future standardization.

The second station 204 transmits, to the first station 202, an announcement message 208. The announcement message 208 includes a confirmation, by the second station 204, that the second station 204 is capable of secure MAC layer communication with the first station 202 according to the secure MAC layer communication protocol indicated by the first station 202 based on a pre-shared secret key.

In one example, the announcement message 208 is an EAPOL announcement message such as is described at Section 11.12 of IEEE Std 802.1X-2010. If the announcement message 206 is an EAPOL announcement message, the confirmation that the second station 204 is capable of secure MAC layer communication with the first station 202 based on the pre-shared secret key may, for example, be encoded in an existing parameter set such as the "MACsec SAK Use" parameter set described in Table 11-7 and Figure 11-10 of IEEE Std 802.1X-2010. For example, an otherwise reserved flag may be utilized to convey the indication. As another example, an exclusive parameter set may be defined to convey the indication.

One or more messages 210 are exchanged in the process of the first station 202 and the second station 204 agreeing on an indication of the pre-shared secret key. This may be, for example, as simple as the first station 202 transmitting to the second station 204 a single message 210 including an indication of the pre-shared secret key. In some examples, the first station 202 and the second station 204 exchange a series of messages 210 in a process of suggesting/negotiating and indicating agreement on a pre-shared secret key.

The first station 202 and the second station 204 independently determine or retrieve the pre-shared secret key based on the agreed-upon indication of the pre-shared secret key. The first station 202 and the second station 204 exchange one or more messages 212 comprising secure MAC layer communication based on the pre-shared secret key. In some examples, the secure MAC layer communication is based on the pre-shared secret key and, in some examples, the secure MAC layer communication is based on a key, such as a session key, that is based upon the pre-shared secret key.

Figure 3:
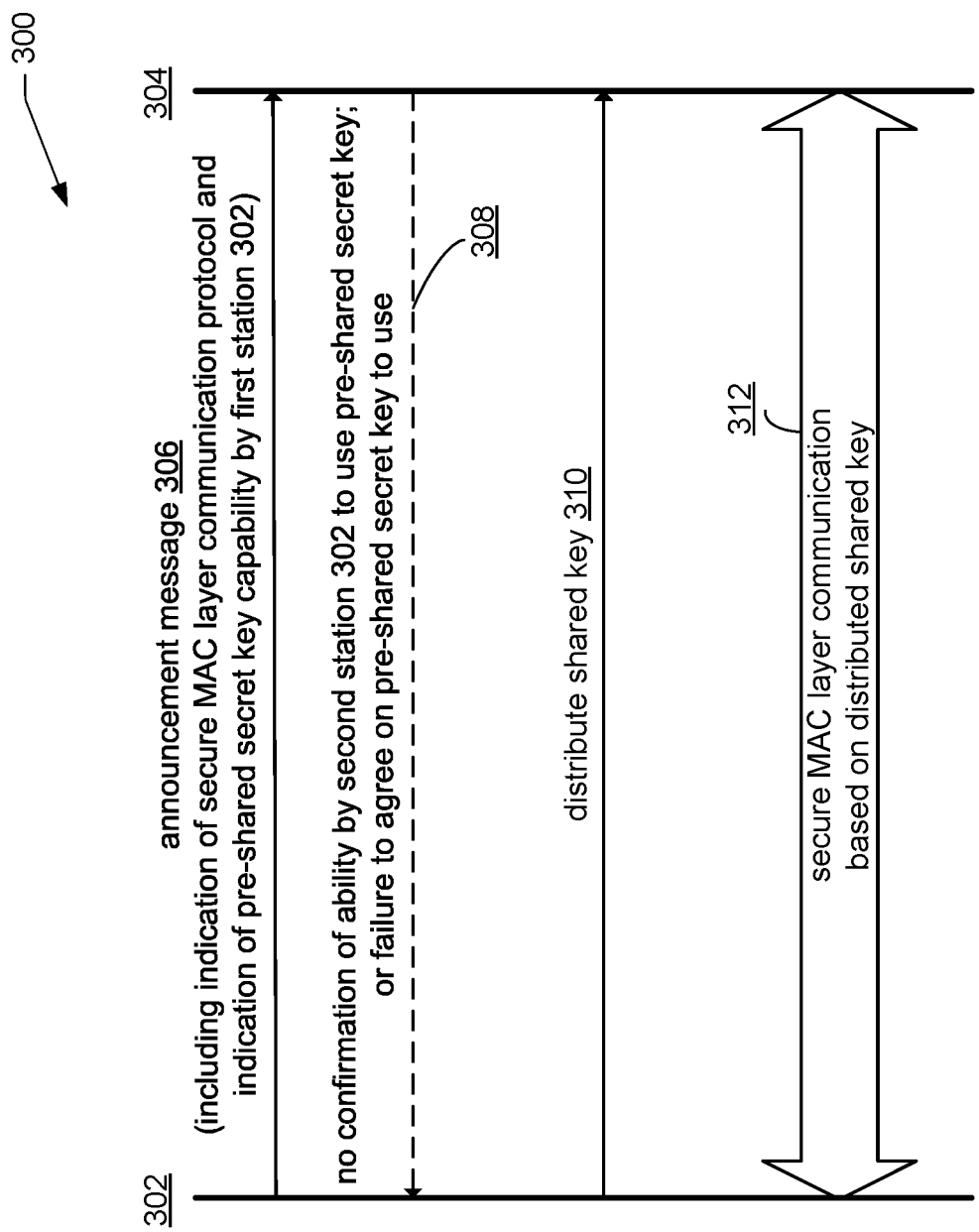
FIG. 3 is a diagram illustrating a system including a first station and a second station, and the second station is not capable of communication according to a secure MAC layer communication protocol based on a pre-shared secret key.

FIG. 3 is a diagram illustrating a configuration 300 including a first station 302 and a second station 304. Similar to the FIG. 2 configuration 200, the first station 302 transmits, to the second station 304, an announcement message 306 concerning network access conditions. In one example, the announcement message 306 is an EAPOL announcement message such as is described at Section 11.12 of IEEE Std 802.1X-2010. The network access conditions indicated in the announcement message 306 may include an indication of a secure MAC layer communication protocol to use for communication between the first station 302 and the second station 304. The announcement message 306 also includes an indication that the first station 302 is capable of secure MAC layer communication with the second station 304 according to the indicated secure MAC layer communication protocol based on the pre-shared secret key.

The dashed line 308 denotes that the second station 304 is not capable of secure MAC layer communication with the first station 202 based on a pre-shared secret key. For example, the second station 304 may not even be configured to interpret the indication of pre-shared secret key capability transmitted by the first station 302 to the second station 304. In such a case, the second station 304 may not respond to the indication. As another example, the second station may be generally capable of secure may layer communication based on a pre-shared secret key, but the first station 302 and the second station 304 may not be able to agree on a pre-shared secret key or indication of pre-shared secret key to use.

The first station 302 transmits one more messages 310 to distribute a secret key. For example, the one or more messages 310 may be an EAPOL-MKA PDU such as is described at Section 11.11 of IEEE Std 802.1X-2010. If the one or more messages 310 is an EAPOL-MKA PDU, the secret key may be encoded in the "Distributed SAK" parameter set described in Table 11-7, Figure 11-11 and Figure 11-12 of IEEE Std 802.1X-2010.

The first station 302 and the second station 304 exchange one or more messages 312 comprising secure MAC layer communication based on the distributed shared key. In some examples, the secure MAC layer communication uses the distributed shared key and, in some examples, the secure MAC layer communication uses a key, such as a session key, that is based upon the distributed shared key.

FIG. 4 illustrates an example format 400 of a distributed SAK parameter set of the EAPOL MKPDU as described in Table 11-7 and Figure 11-18 of IEEE Std 802.1X-2010, as modified to be used by a first station, such as the first station 202 or the first station 302, to include an indication that the first station is capable of secure MAC layer communication with the second station, such as the second station 204 or the second station 304, based on a pre-shared secret key. The format 400 for the distributed SAK parameter set includes a field, in octet 1, to indicate that it is of Parameter set Type=4.

A parameter set of Parameter set Type=4 is described, in IEEE Std 802.1X-2010, as a "Distributed SAK parameter set (GCM-AES-128)" or a "Distributed SAK parameter set (other MACsec Cipher Suites)." The format 400 is the second type, as it includes a "MACsec Cipher Suite" field in octet 9 to octet 16. In some examples, the techniques described herein may use a format of the first type. Bit 4 of octet 2, as described in IEEE Std 802.1X-2010, is a reserved bit. By reserved, it is meant that the bit has no meaning, i.e., is "don't care" for a station that is receiving a message including a parameter set having Parameter set Type=4.

In accordance with the techniques described herein, bit 4 of octet 2 may be given meaning and considered as the indication that the first station is capable of secure MAC layer communication with the second station based on a pre-shared secret key. For example, the first station may set bit 4 of octet 2 to indicate that the first station is capable of secure MAC layer communication with the second station based on a pre-shared secret key. Otherwise, the first station may clear bit 4 of oct 2 to indicate that the first station will communicate with the second station by secure MAC layer communication based on a distributed shared key.

In the FIG. 4 example format, the message including the indication that the first station is capable of secure MAC layer communication with the second station based on a pre-shared secret key also includes an indication of the pre-shared secret key. That is, in the FIG. 4 example format 400, the octets 17-40 include an AES Key Wrap of the indication of the pre-shared key. In the FIG. 4 example format 400, the indication of the pre-shared secret key is a PSK_ID, as described above. "AES Key Wrap" means that the indication of the pre-shared key identifier is encrypted as described in RFC 3394, entitled "Advanced Encryption Standard (AES) Key Wrap Algorithm" and dated September 2002. Otherwise, in the FIG. 4 example format, for a message including an indication that the first station will communicate with the second station by secure MAC layer communication based on a distributed SAK, the octets 17-40 include an AES key wrap of the distributed SAK.

Figure 5:
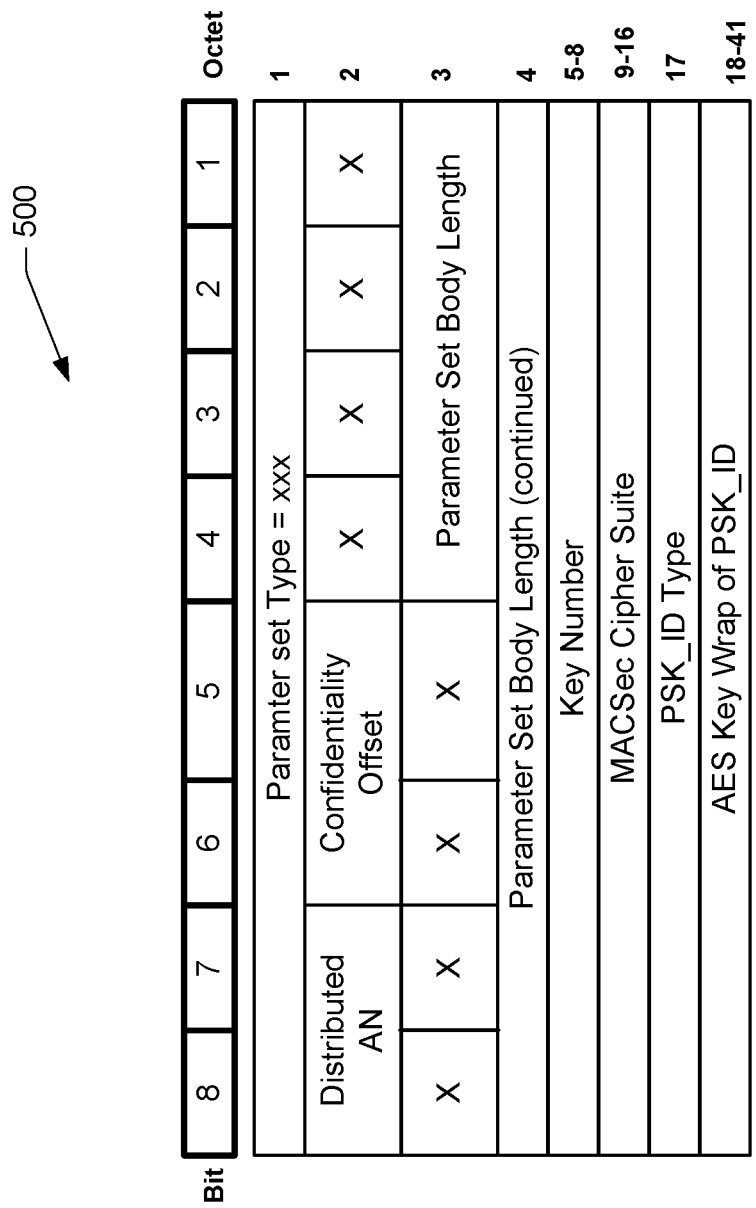
FIG. 5 illustrates an example format of a basic parameter set of an EAPOL announcement message using a pre-shared secret key (PSK) capabilities TLV that is not explicitly described in IEEE Std 802.1X-2010.

FIG. 5 illustrates an example format 500 of a distributed pre-shared key-identifier parameter set of an EAPOL MKPDU that is not explicitly described in IEEE Std 802.1X-2010. The distributed pre-shared key identifier parameter set may be used by a first station, such as the first station 202 or the first station 302, to provide an indication that the first station is capable of secure MAC layer communication with the second station, such as the second station 204 or the second station 304 based on a pre-shared secret key. The Parameter set Type is shown in FIG. 5 as xxx but, as discussed above, there may be advantages in some instances to using a Parameter set Type=110. The FIG. 5 example format 500 is similar in many respect to the "Distributed SAK" parameter set described in Table 11-7 and Figure 11-12 of IEEE Std 802.1X-2010. One difference is that, in the FIG. 5 example format 500, octet 17 is a "PSK_ID Type" field. PSK_ID Type can be of PSK_ID_OPAQUE (for those implementations that choose not to disclose the type of PSK) or PSK_ID_FIXED (for potential interoperability). See, for example, Section 5.1 of Internet Engineering Task Force, Internet Draft entitled "Mixing Preshared Keys in IKEv2 for Post-quantum Security" dated Jan. 14, 2020. Referring still to the FIG. 5 example format 500, the octets 17-40 include an AES Key Wrap of the indication of the pre-shared secret key. In the FIG. 5 example format 500, the indication of the pre-shared secret key is a PSK_ID, as described above.

Similar formats may be used for a response message from a second station, like the second station such as the second 204 or the second station 304, to respond to an indication that the first station, such as the first station 202 or the second station 302, is capable of secure MAC layer communication with the second station based on a pre-shared secret key. For example, for such a response message, an existing parameter set like "MACsec SAK Use," as described in Table 11-7 and Figure 11-10 of IEEE Std 802.1X-2010, may be modified by considering a reserved flag to convey the PSK_ID status. As another example, analogous to the FIG. 5 example format 500 of a distributed pre-shared key-identifier parameter set of an EAPOL MKPDU that is not explicitly described in IEEE Std 802.1X-2010, a format for a PSK_ID Status Parameter Set may be defined. The format may include a PSK_ID status field. As with the FIG. 5 example format 500, the format for the PSK_ID Status Parameter Set is not explicitly described in IEEE Std 802.1X-2010.

In the response message, whatever the format, the second station may indicate that the second station is capable of secure MAC layer communication with the first station based on a pre-shared secret key. If such a response message is not received within a particular time frame, for example, the first station may proceed with distributing a shared key to the second station, to configure the first station and the second station to communicate by secure MAC layer communication based on the distributed shared key and not based on a pre-shared secret key. Thus, the first station may be backwards compatible to interoperate with stations that are not capable of secure MAC layer communication based on a pre-shared secret key.

Otherwise, for example, a first station may provide a PSK_ID to a second station, such as by a message having the FIG. 4 format 400 or the FIG. 5 format. The second station may not recognize the provided PSK_ID or the provided PSK_ID may otherwise not be available for use by the second station. In this situation, the second station may provide a message to the first station indicating the PSK_ID status as "reject."

In an example, the first station will continue to transmit different PSK IDs to the second station, until the first station receives a PSK_ID status of "accept" from the second station. For example, the first station may transmit a first PSK_ID to the second station and wait for a responsive message from the second station indicating a PSK_ID status of "accept" or "reject." If the PSK_ID status is "reject," the first station may transmit a second PSK_ID to the second station, and wait for a responsive message from the second station.

This cycle of the first station transmitting a PSK_ID and waiting for a responsive message indicating a PSK_ID status of "accept" or "reject" may continue until a responsive message indicates a PSK_ID status of "accept." In some examples, the process may also be terminated if a configured lifetime expires, such as six seconds, or the first station has transmitted a PSK_ID a configured number of times. In some examples, this configured lifetime is referred to as the MKA Life Time. In some examples, the configured number of times is two, including the original PSK_ID transmission. If the PSK_ID transmission cycle terminates, such as described above, the first station may proceed with distributing a shared key to the second station, to configure the first station and the second station to communicate by secure MAC layer communication based on the distributed shared key and not based on a pre-shared secret key.

Figure 6:
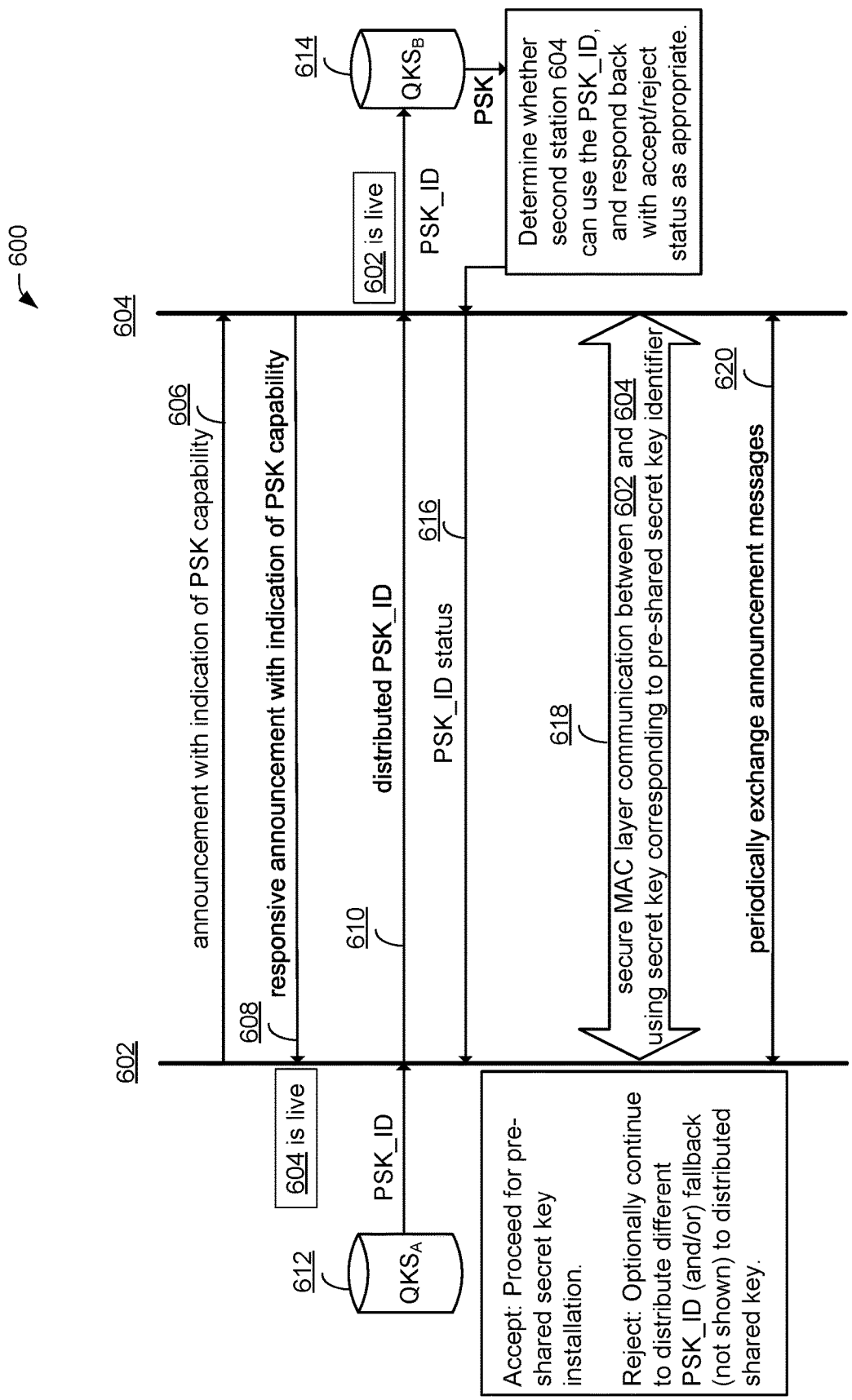
FIG. 6 is a detailed diagram illustrating a configuration including a first station and a second station and shows details of messages exchanged between the first station and the second station in the process of configuring for communication according to a secure MAC layer communication protocol.

FIG. 6 is a diagram illustrating a configuration 600 including a first station 602 and a second station 604. FIG. 6 includes messages passed between the first station 602 and the second station 604, as well as processing at each of the first station 602 and the second station 604, for secure MAC layer communication between the first station 602 and the second station 604.

Turning now to FIG. 6, at 606, the first station 602 provides a message to the second station 604 indicating that the first station 602 is capable of communicating according to the secure MAC layer communication protocol based on a pre-shared secret key. At 608, the second station 604 provides a responsive announcement indicating that the second station 604 is capable of communicating according to the secure MAC layer communication protocol based on a pre-shared secret key. If the second station 604 does not provide the responsive announcement at 608, such as within a predetermined amount of time, then the first station 602 may make a determination to communicate with the second station 604 according to the secure MAC layer communication protocol based on a distributed shared key and not based on a pre-shared secret key. While not shown in FIG. 6, in such an instance, the first station 602 may distribute a key to the second station 604 to use for secure MAC layer communication between the first station 602 and the second station 604 based on the distributed shared key.

After 608, the second station 604 is live. See, for example, IEEE Std 802.1X-2010, section 9.4.3, entitled "Determining liveness." At 610, the first station 602 accesses a quantum key store 612 and provides a pre-shared key identification PSK_ID to the second station 604. The second station 604 accesses a quantum key store 614 and determines whether the second station 604 can use the PSK_ID to configure for secure MAC layer communication with the first station 602 based on a pre-shared secret key. If so, the second station 604 configures with a pre-shared secret key based on the PSK_ID. At 616, the second station 604 provides a PSK_ID status indicating whether the second station 604 can use the PSK_ID ("accept" or "reject"). If the PSK_ID status indicates "accept," then the first station 602 also configures with the pre-shared secret key based on the PSK_ID.

If the PSK_ID status indicates "reject," then the first station 602 and the second station 604 may, in some examples, repeat 610 and 616 with at least one different PSK_ID. Upon a second rejection (or more rejections, if so configured), the first station 602 may make a determination to communicate with the second station 604 according to the secure MAC layer communication protocol based on a distributed shared key and not based on the pre-shared secret key. While not shown in FIG. 6, in such a situation, the first station 602 may distribute a shared key to the second station 604, to use for secure MAC layer communication between the first station 602 and the second station 604 based on the distributed shared key.

Otherwise, at 618, the first station 602 and the second station 604 communicate according to a secure MAC layer communication protocol based on the pre-shared secret key. At 620, the first station 602 and the second station 604 continue to exchange announcement messages to maintain the communication 618 according to the secure MAC layer communication protocol based on the pre-shared secret key.

Figure 7:
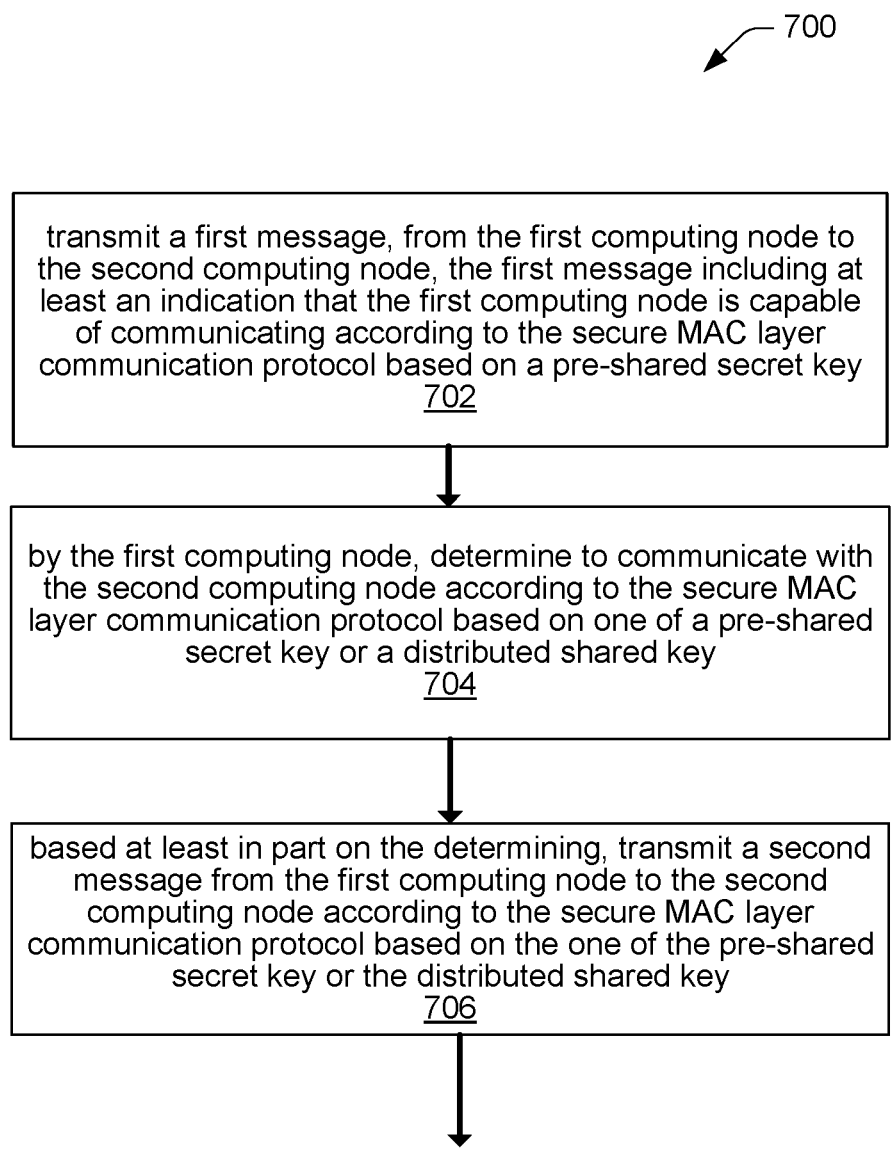
FIG. 7 is a flowchart for an example process by which a first computing node interoperates with a second computing node to establish communication according to a secure MAC layer communication protocol.

FIG. 7 is a flowchart for an example process 700 by which a first computing node interoperates with a second computing node to establish communication according to a secure MAC layer communication protocol. At 702, a first computing node transmits a first message, from the first computing node to the second computing node. The first message includes at least a first indication that the first computing node is capable of communicating according to the secure MAC layer communication protocol based on a pre-shared secret key. At 704, the first computing node determines to communicate with the second computing node according to the secure MAC layer communication protocol based on one of a pre-shared secret key or a distributed shared key. At 706, the first computing node, at least in part based on the determining, transmits a second message to the second computing node according to the secure MAC layer communication protocol based on the one of the pre-shared secret key or a distributed shared key.

For example, the first computing node may receive a message from the second computing node indicating that the second computing node is capable of communicating transmitting a first message. Further, for example, the first computing node and the second computing node may agree on an indication of a pre-shared secret key. The first computing node may determine to communicate with the second computing node according to the secure MAC layer communication protocol based on the pre-shared secret key. The first computing node may therefore communicate with the second computing node according to the secure MAC layer communication protocol based on the pre-shared secret key. Otherwise, the first computing node may be backward compatible, and may communicate with the second computing node according to the secure MAC layer communication protocol based on a distributed shared key.

Figure 8:
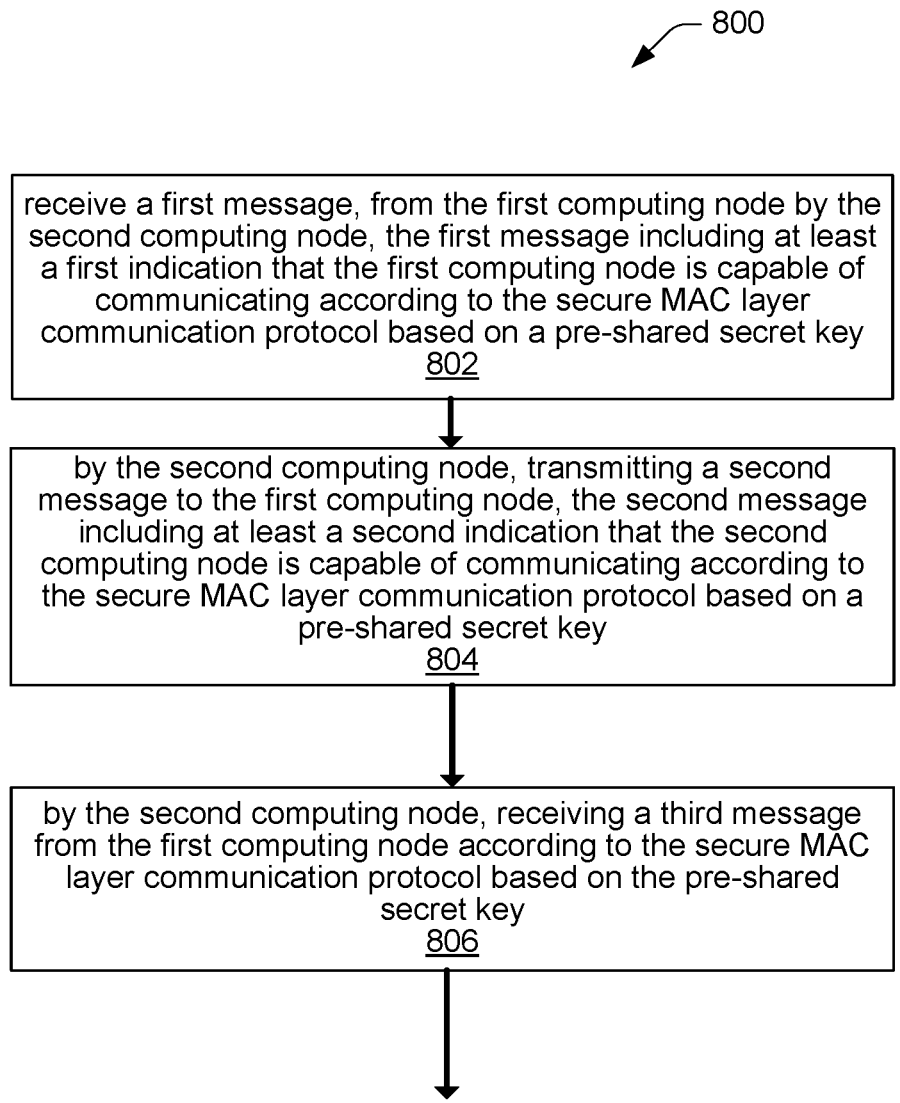
FIG. 8 is a flowchart for an example process 800 by which a second computing node interoperates with a first computing node to establish communication according to a secure MAC layer communication protocol.

FIG. 8 is a flowchart for an example process 800 by which a second computing node interoperates with a first computing node to establish communication according to a secure MAC layer communication protocol. That is, FIG. 8 is a flowchart for a process from the point of view of the second station, whereas the FIG. 7 flowchart is for a process from the point of view of the first station.

At 802, the second computing node receives a first message from the first computing node. The first message includes at least a first indication that the first computing node is capable of communicating according to the secure MAC layer communication protocol based on a pre-shared secret key. At 804, the second computing node transmits a second message to the first computing node. The second message includes at least a second indication that the second computing node is capable of communicating according to the secure MAC layer communication protocol based on a pre-shared secret key. At 806, the second computing node receives a third message from the first computing node according to the secure MAC layer communication protocol based on the pre-shared secret key.

Thus, for example, if the second computing node is capable of communicating according to the secure MAC layer communication protocol based on a pre-shared secret key, the second computing node notifies the first computing node. As a result, the first computing node communicates with the second computing node according to the secure MAC layer communication protocol based on a pre-shared secret key.

Figure 9:
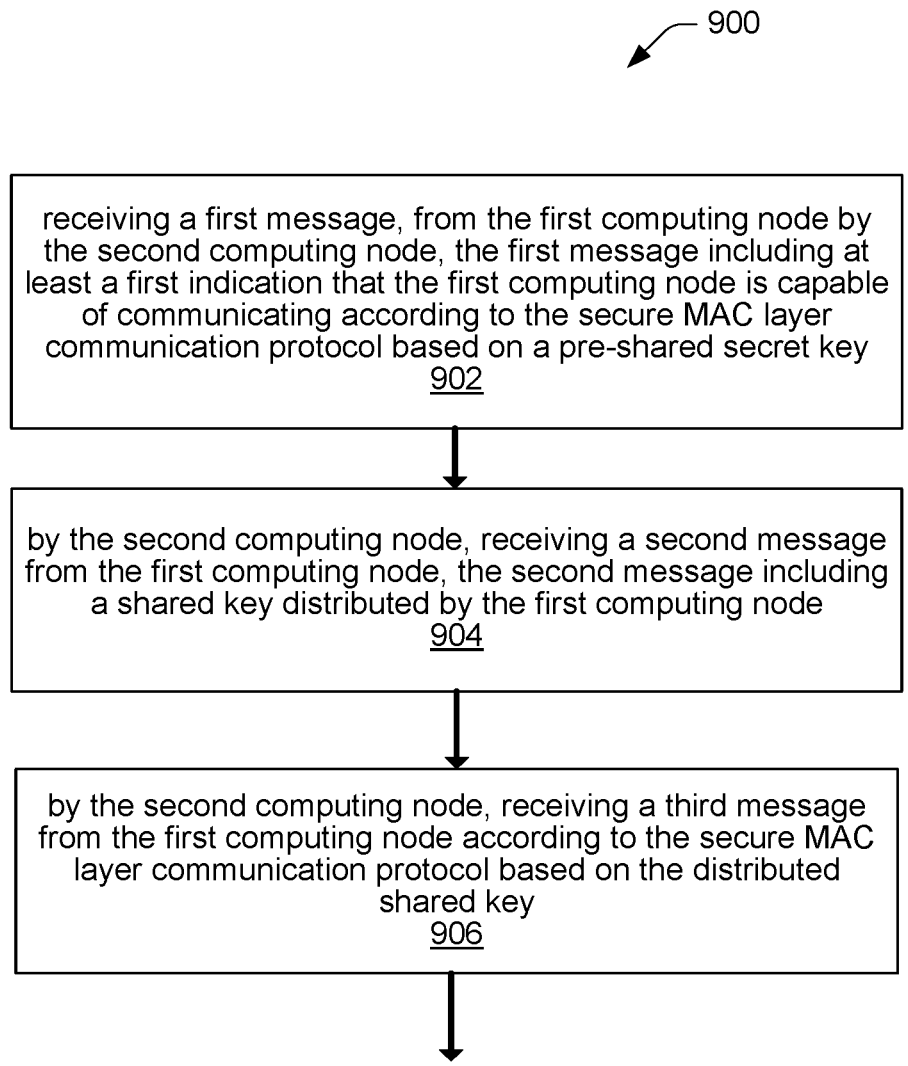
FIG. 9 is a flowchart for an example process in which a second computing node is not capable of communicating with a first computing node according to a secure MAC layer communication protocol based on a pre-shared secret key.

FIG. 9 is a flowchart for an example process 900. In accordance with the process, a second computing node is not capable of communicating with a first computing node according to a secure MAC layer communication protocol based on a pre-shared secret key. At 902, the second computing node receives a first message, from the first computing node. The first message includes at least a first indication that the first computing node is capable of communicating according to the secure MAC layer communication protocol based on a pre-shared secret key. At 904, the second computing nodes receives a second message from the first computing node. The second message includes a shared key distributed by the first computing node. At 906, the second computing node receives a third message from the first computing node according to the secure MAC layer communication protocol based on the distributed shared key. Thus, for example, if the second computing node does not indicate the second computing node is capable of communicating according to the secure MAC layer communication protocol based on a pre-shared secret key, the first computing node may revert to communicating with the second computing node according to the secure MAC layer communication protocol based on a distributed shared key.

Figure 10:
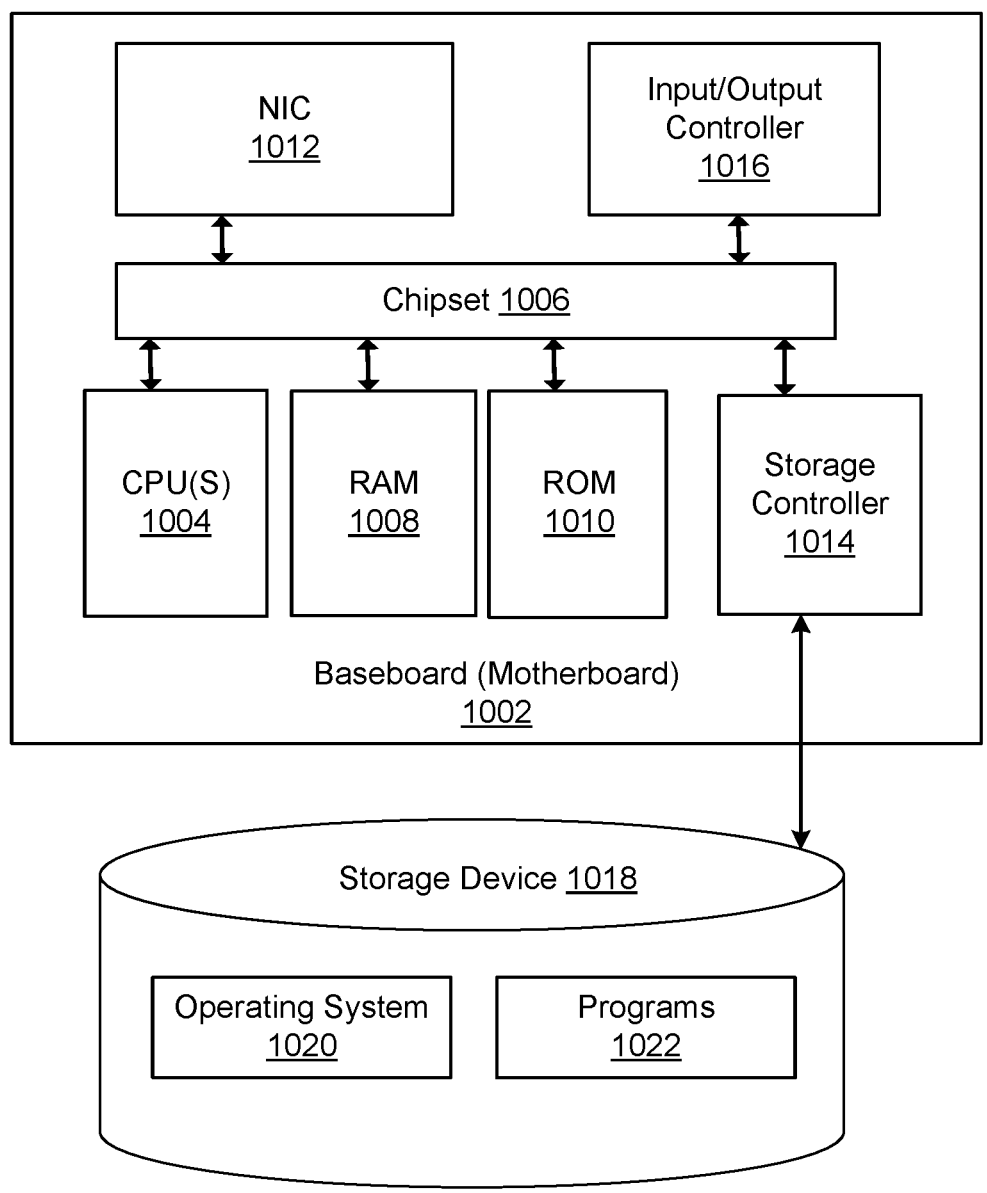
FIG. 10 illustrates an example computer architecture for a computer capable of executing program components for implementing the functionality described herein.

FIG. 10 illustrates an example computer architecture for a computer 1000 capable of executing program components for implementing the functionality described above. The computer architecture shown in FIG. 10 illustrates an architecture of a server computer, workstation, desktop computer, laptop, tablet, network appliance, e-reader, smartphone, network switch, or other computing device, and can be utilized to execute any of the software components presented herein. The computer 1000 may, in some examples, correspond to a network infrastructure device discussed herein.

The computer 1000 includes a baseboard 1002, or "motherboard," which may be a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be, for example, standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein. As illustrated in FIG. 10, the ROM 1010 or NVRAM can also store data usable by the computer 1000 to generate and/or process attestation information in messages exchanged among the computer 1000 and other devices. In other examples, this data may be stored elsewhere, such as in RAM 1008.

The computer 1000 can operate in a networked environment using logical connections to remote computing devices and computer systems through a network. For example, the chipset 1006 can include functionality for providing network connectivity through a Network Interface Controller (NIC) 1012, such as a gigabit Ethernet adapter. The NIC 1012 can connect the computer 1000 to other computing devices over a network. It should be appreciated that multiple NICs 1012 can be present in the computer 1000, connecting the computer to other types of networks and remote computer systems. In some instances, the NICs 1012 may include at least one ingress port and/or at least one egress port. An input/output controller 1016 may be provided for other types of input/output.

The computer 1000 can be connected to a storage device 1018 that provides non-volatile storage for the computer. The storage device 1018 can store an operating system 1020, programs 1022, and data, for example. The storage device 1018 can be connected to the computer 1000 through a storage controller 1014 connected to the chipset 1006. The storage device 1018 can include one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like. For example, the computer 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage device 1018 by detecting the physical states or characteristics of one or more particular locations within the physical storage units.

In addition to the storage device 1018 described above, the computer 1000 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 1000.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method for a first computing node to configure for communication with a second computing node according to a secure Media Access Control (MAC) layer communication protocol, comprising:
    populating, at the first computing node, a portion of a first message with a first indication that the first computing node is capable of utilizing a pre-shared secret key that is used to at least one of encrypt or decrypt communications according to the secure MAC layer communication protocol;
    transmitting the first message from the first computing node to the second computing node;
    by the first computing node, determining to communicate with the second computing node according to the secure MAC layer communication protocol using the pre-shared secret key;
    by the first computing node, retrieving an identifier associated with the pre- shared secret key;
    by the first computing node, transmitting a second message to the second computing node, the second message including a type of the identifier associated with the pre-shared secret key;
    by the first computing node, retrieving the pre-shared secret key based at least in part on the identifier; and
    by the first computing node, transmitting a third message to the second computing node according to the secure MAC layer communication protocol using the pre-shared secret key.

2. The method of claim 1, further comprising:
    receiving, by the first computing node, a second indication from the second computing node indicating that the second computing node is capable of communicating according to the secure MAC layer communication protocol based on the pre-shared secret key,
    wherein the determining comprises determining, based at least in part on the second indication, to communicate with the second computing node based on the pre-shared secret key.

3. The method of claim 1, further comprising:
receiving, at the first computing node, a second indication from the second computing node indicating that the second computing node received the first message from the first computing node,
wherein the determining comprises determining, based at least in part on the second indication, to communicate with the second computing node using the pre-shared secret key.

4. The method of claim 3, further comprising:
receiving, at the first computing node, a third indication from the second computing node indicating that the second computing node can use the identifier associated with the pre-shared secret key,
wherein the retrieving the pre-shared secret key is based at least in part on the third indication.

5. The method of claim 1, wherein the secure MAC layer communication protocol is a MAC security (MACsec) protocol.

6. The method of claim 1, wherein:
the first message is a MAC security (MACsec) Key Agreement Protocol Data Unit (MKPDU) according to IEEE Std 802.1X-2010; and
the first indication that the first computing node is capable of communicating according to the secure MAC layer communication is included within a reserved bit of a distributed secure association Key (SAK) parameter set.

7. The method of claim 1, wherein:
the first message is a MAC security (MACsec) Key Agreement Protocol Data Unit (MKPDU) according to IEEE Std 802.1X-2010; and
the first indication that the first computing node is capable of communicating according to the secure MAC layer communication protocol is included within a parameter set of the MKPDU, wherein octet 17 of the MKPDU is a pre-shared secret key identifier (PSK_ID) Type field.

8. The method of claim 1, further comprising:
receiving, at the first computing node, a fourth message including a second indication that the second computing node is capable of communicating using the secure MAC layer communication protocol;
by the first computing node, retrieving the pre-shared secret key based at least in part on the second indication.

9. The method of claim 1 wherein the pre-shared secret key is retrieved from a quantum key store.

10. A method for a second computing node to configure for communication with a first computing node according to a secure Media Access Control (MAC) layer communication protocol, comprising:
receiving a first message, from the first computing node by the second computing node;
identifying, from a portion of the first message, a first indication that the first computing node is capable of utilizing a pre-shared secret key that is used to at least one of encrypt or decrypt communications according to the secure MAC layer communication protocol;
by the second computing node, transmitting a second message to the first computing node, the second message including at least a second indication that the second computing node is capable of utilizing the pre-shared secret key to communicate according to the secure MAC layer communication protocol;
receiving a third message, from the first computing node by the second computing node;
identifying, from a portion of the third message, a type of an identifier associated with the pre-shared secret key;
by the second computing node, determining that the second computing node can use the identifier associated with the pre-shared secret key;
by the second computing node, transmitting a fourth message to the first computing node, the fourth message including at least a third indication that the second computing node can use the identifier;
retrieving, by the second computing node, the pre-shared secret key based in part on the determining; and
by the second computing node, receiving a fifth message from the first computing node according to the secure MAC layer communication protocol and using the pre-shared secret key to decrypt the fifth message.

11. The method of claim 10, further comprising:
by the second computing node, retrieving the pre-shared secret key based at least in part on the first indication received from the first computing node.

12. The method of claim 10, wherein the secure MAC layer communication protocol is a MAC security (MACsec) protocol.

13. The method of claim 10, wherein:
the first message is a MAC security (MACsec) Key Agreement Protocol Data Unit (MKPDU) according to IEEE Std 802.1X-2010; and
the first indication that the first computing node is capable of communicating according to the secure MAC layer communication protocol based on the pre-shared secret key is included within a reserved bit of a distributed secure association Key (SAK) parameter set.

14. The method of claim 10, wherein:
the first message is a MAC security (MACsec) Key Agreement Protocol Data Unit (MKPDU) according to IEEE Std 802.1X-2010; and
the first indication that the first computing node is capable of communicating according to the secure MAC layer communication protocol is included within a parameter set of the MKPDU, wherein octet 17 of the MKPDU is a pre-shared secret key identifier (PSK_ID) Type field.

15. The method of claim 10 wherein the pre-shared secret key is retrieved from a quantum key store.

16. A method for a second computing node to configure for communication with a first computing node according to a secure Media Access Layer (MAC) layer communication protocol, comprising:
receiving a first message, from the first computing node by the second computing node, wherein the first message is a MAC security (MACsec) Key Agreement Protocol Data Unit (MKPDU) according to IEEE Std 802.1X-2010;
identifying, from a portion of the first message, a first indication that the first computing node is capable of utilizing a pre-shared secret key that is used to at least one of encrypt or decrypt communications according to the secure MAC layer communication protocol, wherein the first indication comprises octet 17 of the MKPDU set to a Pre-shared Secret Key Identifier (PSK_ID) Type field;
by the second computing node, transmitting a second message to the first computing node, the second message including at least a second indication that the second computing node is capable of utilizing the pre-shared secret key to communicate according to the secure MAC layer communication protocol; and by the second computing node, receiving a third message from the first computing node according to the secure MAC layer communication protocol and using the pre-shared secret key.

17. The method of claim 16, further comprising:
by the second computing node, transmitting a fourth message to the first computing node, the fourth message including a second indication that the second computing node is capable of communicating according to the secure MAC layer communication protocol and using the pre-shared secret key.

18. The method of claim 17, further comprising:
by the second computing node, transmitting a fifth message to the first computing node, the fifth message including a third indication that a second pre-shared secret key is unavailable for use by the second computing node.

19. The method of claim 16, wherein:
the first indication that the first computing node is capable of communicating according to the secure MAC layer communication protocol based on a pre-shared secret key is included within a reserved bit of a distributed secure association Key (SAK) parameter set.

20. The method of claim 16, further comprising:
by the second computing node, retrieving the pre-shared secret key based at least in part on the first indication received from the first computing node.

* * * * *